United States Patent
Hafemeister

(10) Patent No.: US 6,169,585 B1
(45) Date of Patent: Jan. 2, 2001

(54) CIRCUIT ARRANGEMENT FOR DEMODULATING AN INTERMEDIATE-FREQUENCY VIDEO SIGNAL

(75) Inventor: Thomas Hafemeister, Hamburg (DE)

(73) Assignee: U.S. Philips Corporation, New York, NY (US)

( * ) Notice: Under 35 U.S.C. 154(b), the term of this patent shall be extended for 0 days.

(21) Appl. No.: 09/256,480

(22) Filed: Feb. 23, 1999

(30) Foreign Application Priority Data

Apr. 2, 1998 (DE) .............................................. 198 14 806

(51) Int. Cl.[7] .......................... H04N 5/455; H04N 5/50; H04L 27/14; H03L 7/00
(52) U.S. Cl. ......................... 348/726; 348/725; 348/731; 348/727; 455/265; 455/180.3; 329/347; 329/349; 329/350; 329/351; 329/360; 333/17; 333/16; 333/20; 333/41; 333/43; 375/324; 375/340
(58) Field of Search .................................. 348/726, 725, 348/727, 731; 455/265, 180.3; 329/347, 349, 350, 351, 360; 331/17, 16, 20, 41, 43; 375/324, 340

(56) References Cited

U.S. PATENT DOCUMENTS

| | | | |
|---|---|---|---|
| 4,434,407 | * | 2/1984 | Healey, III et al. ...................... 331/4 |
| 4,680,792 | * | 7/1987 | Tanaka et al. ........................... 381/12 |
| 4,821,097 | * | 4/1989 | Robbins ................................ 358/143 |
| 5,485,221 | * | 1/1996 | Banker et al. ........................ 348/563 |
| 5,526,061 | * | 6/1996 | Brilka et al. .......................... 348/726 |
| 5,570,137 | * | 10/1996 | Goeckler ............................... 348/726 |
| 5,648,823 | * | 7/1997 | Stepp et al. ........................... 348/726 |
| 5,663,773 | * | 9/1997 | Goeckler ............................... 348/726 |
| 5,974,095 | * | 10/1999 | Kitaura et al. ........................ 375/340 |

* cited by examiner

Primary Examiner—Michael Lee
Assistant Examiner—Paulos Natnael
(74) Attorney, Agent, or Firm—Steven R. Biren

(57) ABSTRACT

In a circuit arrangement for demodulating an intermediate-frequency video signal generated while using a Nyquist edge, having a phase-locked loop (1) including a phase detector (3), a loop filter (4) and a voltage-controlled oscillator (5), and a video demodulator (2), the intermediate-frequency video signal being applied to the phase detector (3) and the output signal of the phase-locked loop (1) being applied to the video demodulator (2), which converts the intermediate-frequency video signal into a baseband video signal, phase fluctuations contained in the carrier of the intermediate-frequency video signal due to its generation while using a Nyquist edge are compensated in that the phase comparator (3) operates, by approximation, independently of modulation in the control range of the intermediate-frequency video signal, in that the baseband video signal is present in an inverted form with respect to the intermediate-frequency video signal, and in that a correction signal is derived from the baseband video signal by at least a feedback capacitor (8), this correction signal having signal components of opposite amplitude and phase position to those contained in the intermediate-frequency video signal and caused by the Nyquist edge, and is applied to the loop filter (4).

10 Claims, 2 Drawing Sheets

CIRCUIT ARRANGEMENT FOR DEMODULATING AN INTERMEDIATE-FREQUENCY VIDEO SIGNAL

BACKGROUND OF THE INVENTION

1. Field of the Invention

The invention relates to a circuit arrangement for demodulating an intermediate-frequency video signal generated while using a Nyquist edge, comprising a phase-locked loop including a phase detector, a loop filter and a voltage-controlled oscillator, and a video demodulator, the intermediate-frequency video signal being applied to the phase detector and the output signal of the phase-locked loop being applied to the video demodulator which converts the intermediate-frequency video signal into a baseband video signal.

2. Description of the Related Art

Circuit arrangements of this type are generally used for demodulating an IF video signal, i.e., for converting a video signal from the IF range, in which it is modulated in an amplitude-modulated form on an IF carrier, to the baseband. The IF video signal was previously filtered from a high-frequency mixture, using a Nyquist edge, Which has the result that the side bands of the video signal are amplified to differently strong extents in their range. Dependent on the amplitude of the video signal and hence, also on the carrier, this effect causes a phase modulation. Thus, a kind of conversion of an amplitude modulation to a phase modulation takes place. The phase modulation means that the IF carrier is phase modulated in the IF video signal. The phase-locked loop follows this phase modulation, so that the signal applied for demodulation to the video demodulator is also phase modulated. This, in turn, leads to the linearity of the video signal being influenced during demodulation.

SUMMARY OF THE INVENTION

It is an object of the invention to improve the circuit arrangement of the type described in the opening paragraph to such an extent that a phase modulation in the output signal of the phase-locked loop is suppressed.

According to the invention, this object is solved in that the phase comparator operates, by approximation, independently of modulation in the control range of the intermediate-frequency video signal, in that the baseband video signal is present in an inverted form with respect to the intermediate-frequency video signal, and in that a correction signal is derived from the baseband video signal by means of at least a feedback capacitor, this correction signal comprising signal components of opposite amplitude and phase position than those contained in the intermediate-frequency video signal and caused by the Nyquist edge, and is coupled to the loop filter.

The phase comparator in the PLL receives the IF video signal and the output signal from the voltage-controlled oscillator of the PLL. The output of the phase comparator supplies a control signal which is applied, via the loop filter, to a control input of the voltage-controlled oscillator. A condition for the faultless operation of the circuit arrangement according to the invention is that the phase comparator operates independent of modulation in the control range of the IF video signal, i.e., its output signal is actually dependent only on the phase relations of the two input signals and is not dependent on their modulation or amplitude.

The output of the voltage-controlled oscillator hence, the PLL supplies a signal which, in the ideal case, is sine-shaped, and is used for the video demodulator for demodulating the IF video signal applied thereto. The output of the video demodulator supplies the baseband video signal. In many known video demodulators, this signal is present in an inverted form with respect to the IF video signal. In the circuit arrangement according to the invention, this inverted baseband video signal must be generated either by a video demodulator constructed in this manner or by an inverter arranged subsequent to the video demodulator.

The baseband video signal generated in this way is fed back to the loop filter by means of at least one feedback capacitor. By means of this feedback capacitor, a correction signal is formed which compensates signal components which are comprised in the IF video signal and have been produced by generating the IF video signal by means of a Nyquist edge. These signal components are comprised in the correction signal with opposite amplitude and phase position so that they compensate each other in the loop filter with the corresponding disturbances.

In spite of the relatively simple construction, this compensation, by means of feedback via the feedback capacitor, is successful because the above-mentioned disturbances in the baseband video signal are present in the appropriate phase position which, in turn, is shifted by the feedback capacitor in such a way that the corresponding signal components are compensated.

An example will elucidate that this compensation actually occurs.

If the circuit arrangement receives, for example, an IF picture signal whose picture contents have the form of a cosine within which the contrast of the picture contents thus changes cosinusoidally via a picture line, then the carrier in the IF video signal is cosine-modulated, accordingly. Since this IF video signal was filtered from a high-frequency mixture by means of a Nyquist edge, the carrier comprises, however, a phase modulation. This has been produced by the fact that, in the range of the Nyquist edge, the side bands of the video signal are amplified to a differently strong extent. If the amplitude of the carrier fluctuates, a phase modulation is produced by this differently strong amplification of the side bands. Thus, a quasi-conversion from an amplitude modulation to a phase modulation takes place.

In the above-mentioned example, in which the picture signal is cosinusoidally modulated, the fundamental wave of this phase modulation is sinusoidal (90° phase-shifted). In addition to this fundamental wave, further phase modulation components are present which, however, are not important for the further processing of the signal. The IF signal with the sinusoidal phase modulation of the carrier is applied to an input of the phase detector. Since the output signal of the phase detector is, by definition, approximately proportional to the phase modulation of the input signal, the control signal at the output of the phase detector is also phase shifted by 90° with respect to the cosine-shaped picture signal. It is, however, decisive that the output signal of the phase detector comprises phase modulation disturbances which are produced by the above-described phase modulation of the IF picture carrier. However, due to the phase shift, these interference components are now sinusoidal in the control signal of the phase detector i.e., compared with the cosine-shaped phase modulation of the fundamental wave, they are phase-shifted.

Due to these phase disturbances, the phase detector thus supplies a signal fluctuating at a sinusoidal fundamental wave, with which signal, the VCO is corrected. This is undesirable because the VCO should operate at a constant frequency in order that the video signal can be linearly demodulated during the video demodulation. The video demodulator demodulates the IF video signal which, in this example, has the cosine-shaped picture contents. Many known video demodulators supply this signal as a baseband signal in an inverted form with respect to the IF video signal so that the picture contents are minus cosine-shaped in this case. If this were not the case, the demodulator should be followed by an inverter. In any case, a picture signal having a minus cosine-shaped variation is now available in the baseband position. Due to the phase modulation of the control signal of the VCO and hence also its output signal, each signal comprises harmonics which are, however, not disturbing for the further feedback processing operation in accordance with the invention.

According to the invention, the inverted baseband signal is fed back via a capacitor to the loop filter of the PLL. Due to this capacitor, there is a 90° phase shift so that the signal at the coupling point in the loop filter has a minus sine-shaped variation and thus has exactly the opposite phase position as compared with the phase disturbance at the output of the phase detector which has a plus sine-shaped variation and phase position. These two signals are thus superimposed at the correct phase in the loop filter and possibly also with a similar amplitude so that, in the ideal case, the above-mentioned phase fluctuations at the output of the phase detector and at the input of the loop filter are compensated. The VCO thereby receives a constant signal which no longer comprises the disturbances caused by the above-described phase modulation so that the VCO supplies a constant signal at a constant frequency in the desired manner.

In summary, it can be concluded that, by feedback of the baseband video signal, a correction signal is derived which, with regard to phase and amplitude, is opposed to the phase fluctuations of the output signal of the phase detector. This relates to the phase fluctuations which are produced by the phase modulation of the IF video signal.

An essential advantage of the circuit arrangement according to the invention is not only its simple structure but also the fact that the PLL may have a relatively large bandwidth without this leading to corresponding disturbances in the video signal. This is achieved in that the above-described phase disturbances in the IF video signal do not lead to corresponding phase disturbances of the VCO of the PLL. Consequently, no disturbances occur in the picture signal or in a sound signal transmitted together with the picture signal, not even at a relatively large bandwidth of the PLL. The circuit arrangement according to the invention provides a constant compensation of phase disturbances occurring in the video signal. The relatively large possible bandwidth of the PLL, which is made possible by the circuit arrangement according to the invention allows interference-free processing of frequency-unstable carrier signals.

An attenuation capacitor, provided in a modified embodiment of the invention, is coupled to a reference potential. The feedback capacitor causes the current flowing therethrough to rise to high frequencies. This is fundamentally desirable because the phase modulation at the output of the phase detector also rises to high frequencies. With an increasing modulation of the IF video signal and when the limits of the Nyquist edges are reached, the above-mentioned phase disturbances do not, however, increase any further, but stay substantially constant at a further increasing amplitude. To take this condition into account, the attenuation capacitor is provided which, at increasing frequency, couples the current supplied by the feedback capacitor to the reference potential. It is thereby achieved that the increase of the compensation current to higher frequencies is compensated by the attenuation capacitor. This, in turn, has the result that the amplitude of the compensation signal supplied to the loop filter has substantially the same frequency variation as the fundamental wave of the interference excitation at the output of the phase detector, caused by the above-described described phase modulation. An optimum compensation of this interference excitation is thereby achieved.

A further embodiment of the invention, characterized in that the correction signal is exclusively coupled to the loop filter by means of an electronic switch only during those periods when the phase-locked loop is in a locked-in state, improves the lock-in behavior of the PLL and allows the above-described compensation in the locked-in state.

A further embodiment of the invention, characterized in that the baseband video signal is applied to an amplitude limiter before it is coupled to the feedback capacitor, which amplitude limiter limits the signal to an amplitude range between video signal amplitudes assigned to "white" and "black" signal contents, has the result, in response to the amplitude limitation of the baseband video signal, that only those signal components comprising the video signal are taken into account for gaining the compensation signal. Particularly in an unlocked state of the PLL, it is achieved by way of the amplitude limitation that disturbing signal components in the baseband signal are suppressed.

The circuit arrangement may be completed for processing video signals of different transmission standards by means of a switchable polarity inverter which compensates the different modes of modulation.

These and other aspects of the invention will be apparent from and elucidated with reference to the embodiments described hereinafter.

BRIEF DESCRIPTION OF THE DRAWINGS

In the drawings:

In FIG. 1, a block diagram of a first embodiment of the invention shows a phase-locked loop (PLL) 1 and a video demodulator 2.

DESCRIPTION OF THE PREFERRED EMBODIMENTS

Figure 1:
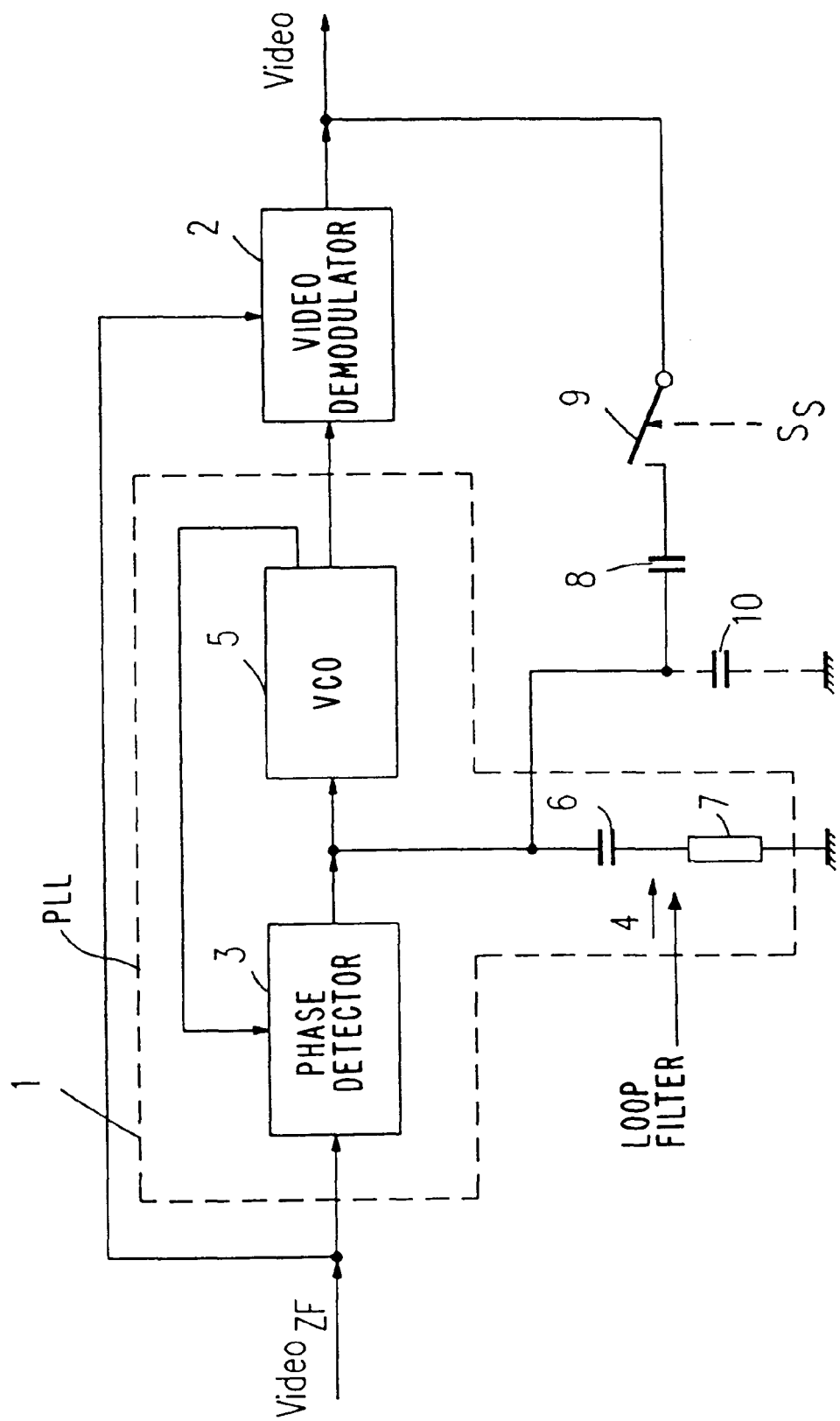
FIG. 1 shows a first embodiment of the circuit arrangement according to the invention, with an attenuation capacitor and an electronic switch.

The PLL 1 includes a phase detector 3, an input of which receives an intermediate-frequency (IF) video signal. The output of the phase detector 3 supplies a correction signal which is coupled to a loop filter 4 consisting of a series circuit of a capacitance 6 and a resistor 7. The resistor 7 is coupled to a reference potential.

The loop filter 4 precedes a voltage-controlled oscillator (VCO) 5 whose output signal is applied to a second input of the phase detector 3 and to the video demodulator 2.

The IF video signal is applied for demodulation to the video demodulator 2. The output of the video demodulator 2 supplies this video signal in the baseband position, but in an inverted form.

Prior-art circuit arrangements are limited to these circuit elements. However, in these cases, a problem occurs that in the IF video signal, phase disturbances comprised in this signal, due to its generation by means of a Nyquist edge, propagate in the PLL 1 and lead to a phase-disturbed signal of the VCO 5 so that also the video demodulation in the video demodulator 2 is disturbed and non-linearities occur in the baseband video signal.

For example, if a cosine-shaped picture content occurs in the IF video signal, a phase modulation occurs in the carrier frequency of the IF video signal due to the Nyquist edge. This phase modulation occurs at the output of the phase detector 3, i.e., in its control signal, with a changed phase position, namely, with a sine shape. This control signal, which is coupled to the VCO 5, thus comprises a sinusoidal disturbance which leads to a corresponding correction of the VCO 2.

To avoid these disturbing effects, the circuit arrangement according to the invention has a feedback capacitor 8 which is coupled to the input of the loop filter 4. Moreover, an electronically controlled switch 9 as well as a further capacitance 10 are optionally provided, this capacitance being coupled to the reference potential as an attenuation capacitance at the input of the loop filter 4.

The baseband video signal which, with respect to the IF video signal, is present in an inverted form as regards the picture contents, is fed back via the feedback capacitor 8 to the input of the loop filter. There it is superimposed with the output signal of the phase detector 3.

In the example described above, in which the IF video signal has a cosine-shaped picture content, the baseband video signal supplied from the output of the video demodulator 2 is thus present in a minus cosine-shaped phase position. Due to the feedback of this signal via the feedback capacitor 8, this signal is subjected to a phase shift of 90° so that it is coupled in, at the input of the loop filter 4, with a minus sine-shaped phase position.

Due to the Nyquist edge, the above-described cosine-shaped picture content of the IF video signal leads to a sine-shaped interference excitation of the output signal of the phase detector 3 at the output of this phase detector. The interference excitation, which is comprised in the output signal of the phase detector 3, is thus exactly in phase opposition with the signal supplied by the feedback capacitor 8. With a corresponding dimensioning of the circuit arrangement, these signals may also be implemented in such a way that they have substantially the same amplitude but an opposite sign. It is thereby achieved that the interference components comprised in the output signal of the phase detector 3 and produced in the manner described above are compensated by means of the signal gained via the feedback capacitor 8. As a result, it is achieved that the phase modulation of the picture carrier produced by the phase modulation of the picture carrier in response to the Nyquist edge is completely compensated so that a signal is available at the input of the VCO 5 which is no longer influenced by these interference components. The VCO is thus ideally corrected in dependence upon the intermediate frequency without the phase disturbance comprised in the carrier frequency of the IF signal influencing the VCO 5. The VCO 5 thus supplies a signal which is not influenced by this phase disturbance so that a conversion of the video signal in the baseband succeeds by means of the video demodulator 2 without this phase disturbance causing non-linearities.

The compensation signal can be advantageously gained by means of the feedback capacitor 8 only when the PLL 1 is in the locked-in state, i.e., when an intermediate frequency of an IF video signal is detected and the PLL has locked in at this frequency. During those periods when this is not the case, for example, during a station search, the electronic switch 9 may be opened advantageously. A feedback of arbitrary signal components supplied by the video demodulator 2 during such periods will thus be suppressed so that the lock-in behavior of the PLL 1 is not negatively influenced by the feedback capacitor 8 or the signal supplied by this capacitor.

Because of its capacitance properties, the feedback capacitor 8 supplies a signal rising to high frequencies. This is compensated by the attenuation capacitor 10 which also acquires a lower ohmic value towards high frequencies. The high frequencies are coupled to the reference potential by this attenuation capacitor so that the frequency rise in the signal supplied by the feedback capacitor 8 is compensated. It is thereby achieved that the amplitude of the compensation signal supplied to the loop filter 4 has substantially the same frequency variation as the sinusoidal interference excitation at the output of the phase detector. The compensation of the interferences in the output signal of the phase detector 3 is thereby further improved.

Figure 2:
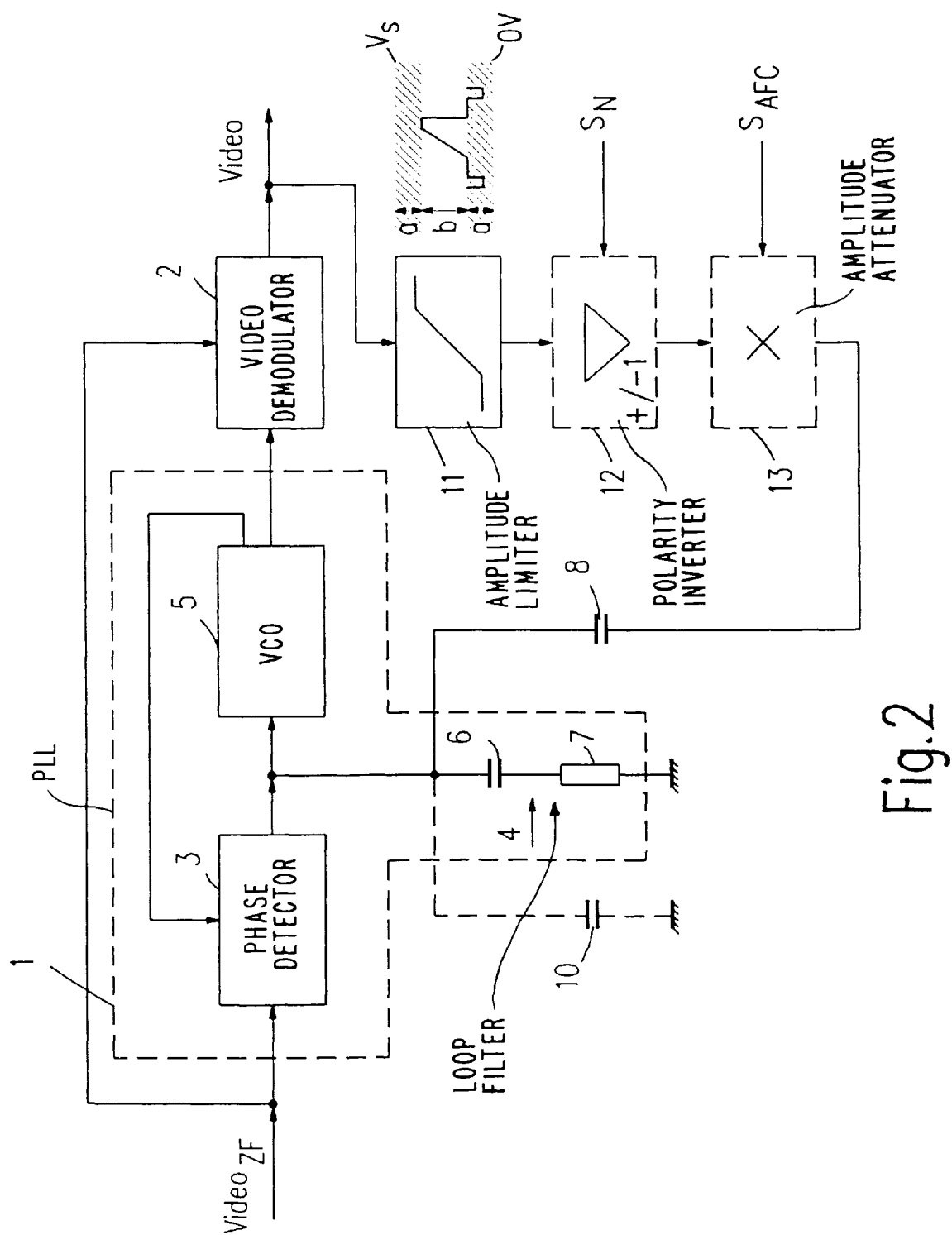
FIG. 2 shows a second embodiment of a circuit arrangement according to the invention, with an amplitude limiter and a polarity inverter.

FIG. 2 shows a second embodiment of the circuit arrangement according to the invention which, as compared with the circuit arrangement of the first embodiment in FIG. 1, is identical as regards the PLL 1, the phase detector 3, the loop filter 4, the VCO 5, the video demodulator 2, the feedback capacitor 8 and the attenuation capacitor 10.

As compared with the first embodiment of FIG. 1, however, the electronic switch 9 is omitted. Instead, the output signal of the video demodulator 2 is applied to an amplitude limiter 11 which limits this signal to amplitude ranges which occur in the video signal. Thus, the extreme amplitude ranges corresponding to a white-level picture signal content and a black-level picture signal content are thus used as limits. All signal values outside these limits are suppressed by the amplitude limiter. It is thereby achieved that, for gaining the compensation signal, only signal components are used which occur in the control range of the video signal. Particularly in the unlocked state of the PLL 1, arbitrary amplitudes occurring in the baseband video signal are suppressed in this way. This particularly improves the lock-in behaviour of the PLL 1.

The output signal of the amplitude limiter 11 may be alternatively applied directly to the feedback capacitor 8.

In the embodiment of FIG. 2, a polarity inverter 12 is provided for processing video signals of different transmission standards, this polarity inverter being switchable for an inversion of the signal, dependent on the mode of modulation of the video signal. The above-described correct phase position of the compensation signal is thereby also achieved at different modes of modulation of the video signal. The polarity inverter 12 is controlled by means of a switching signal $S_N$ which may be obtained, for example, from a standard detection circuit in a television receiver (not shown).

The output signal of the polarity inverter 12 may be directly applied to the feedback capacitor 8.

In the embodiment of FIG. 2, however, the polarity inverter 12 precedes an amplitude attenuator 13 which, in dependence upon an AFC signal from an AFC detector (not shown), reduces the output signal of the amplitude limiter 11. In tuners, the AFC signal is used for frequency correction. It can be deduced from the AFC signal whether the tuner is correctly tuned to an input signal. If this is the case, the controllable amplitude attenuator 13 is set at a transmission factor of "1" and the baseband video signal is thus applied in an amplitude-limited form without signal loss to the feedback capacitor 8 so that the compensation signal with the correct amplitude is generated. However, if the tuner is not correctly tuned to an input signal, another point on the Nyquist edge is referred to and, in connection therewith, a different intensity of the phase disturbance is obtained. To take the changed phase disturbance into account, the compensation signal is reduced. As soon as the control signal $S_{AFC}$, which is generated from the AFC detector, signals a perfect tuning, the amplitude-limited signal is passed on in an unattenuated form and the above-described compensation takes place.

Both embodiments shown in FIGS. 1 and 2 have in common that the compensation of interference in the output signal of the phase detector 3 caused by the phase modulation of the carrier of the IF video signal is effected by way of the compensation signal which is gained from the inverted baseband video signal by means of the feedback capacitor 8 and is supplied to the loop filter 4. Moreover, for improving the behavior of the circuit arrangement, the electronic switch 9, the attenuation capacitor 10 and the amplitude limiter circuit 11 may be provided. A combination of these additional elements is also possible. The polarity inverter 12 and the controllable amplitude attenuator 13 of the embodiment shown in FIG. 2 may also be used in the embodiment shown in FIG. 1.

What is claimed is:

1. A circuit arrangement for demodulating an intermediate-frequency video signal generated while using a Nyquist edge, said circuit arrangement comprising:

a phase-locked loop including a phase detector, a loop filter and a voltage-controlled oscillator; and a video demodulator, the intermediate-frequency video signal being applied to the phase detector and the output signal of the phase-locked loop being applied to the video demodulator, said video demodulator converting the intermediate-frequency video signal into a baseband video signal, characterized in that the phase detector operates, by approximation, independently of modulation in the control range of the intermediate-frequency video signal, in that the baseband video signal is present in an inverted form with respect to the intermediate-frequency video signal, and in that said circuit arrangement further comprises at least a feedback capacitor coupled between an output of the video demodulator and the loop filter, said feedback capacitor deriving a correction signal from the baseband video signal, this correction signal comprising signal components of opposite amplitude and phase position than signal components contained in the intermediate-frequency video signal and caused by the Nyquist edge, and the correction signal being applied to the loop filter.

2. A circuit arrangement as claimed in claim 1, characterized in that the circuit arrangement further comprises an attenuation capacitor for coupling the correction signal supplied by the feedback capacitor to a reference potential.

3. A circuit arrangement as claimed in claim 1, characterized in that said circuit arrangement further comprises an electronic switch for exclusively coupling the correction signal to the loop filter only during periods when the phase-locked loop is in a locked-in state.

4. A circuit arrangement as claimed in claim 1, characterized in that the circuit arrangement further comprises an amplitude limiter coupled between the video demodulator and the feedback capacitor, said amplitude limiter limiting the baseband video signal to an amplitude range between video signal amplitudes assigned to "white" and "black" signal contents.

5. A circuit arrangement as claimed in claim 1, characterized in that the video demodulator supplies the baseband video signal in an inverted form with respect to the intermediate-frequency video signal.

6. A circuit arrangement as claimed in claim 1, characterized in that the loop filter comprises a series arrangement of a capacitance and a resistor which is coupled to a reference potential, the correction signal being applied to the capacitance.

7. A circuit arrangement as claimed in claim 4, characterized in that the circuit arrangement further comprises a switchable polarity inverter coupled to an output of the amplitude limiter, said switchable polarity inverter being switchable in dependence upon the transmission standard of the intermediate-frequency video signal.

8. A circuit arrangement as claimed in claim 4, characterized in that the circuit arrangement further comprises a controllable amplitude attenuator for controlling the correction signal in dependence upon an AFC signal from an AFC detector.

9. A circuit arrangement as claimed in claim 1, characterized in that the circuit arrangement further comprises:

an attenuation capacitor for coupling the correction signal supplied by the feedback capacitor to a reference potential; and an electronic switch for exclusively coupling the correction signal to the loop filter only during periods when the phase-locked loop is in a locked-in state.

10. A circuit arrangement as claimed in claim 1, characterized in that the circuit arrangement further comprises:

an amplitude limiter coupled between the video demodulator and the feedback capacitor, said amplitude limiter limiting the baseband video signal to an amplitude range between video signal amplitudes assigned to "white" and "black" signal;

an attenuation capacitor for coupling the correction signal supplied by the feedback capacitor to a reference potential.

* * * * *